US009632493B2

(12) United States Patent
Negre

(10) Patent No.: US 9,632,493 B2
(45) Date of Patent: Apr. 25, 2017

(54) METHOD OF CONTROLLING A ROBOTIC WORK STATION, AS A FUNCTION OF SYNCHRONIZATION STATES, AND A CORRESPONDING ROBOTIC WORK STATION

(75) Inventor: Bernard Negre, Paris (FR)

(73) Assignee: ABB FRANCE, Rueil Malmaison (FR)

( * ) Notice: Subject to any disclaimer, the term of this patent is extended or adjusted under 35 U.S.C. 154(b) by 1188 days.

(21) Appl. No.: 12/162,495

(22) PCT Filed: Jan. 30, 2007

(86) PCT No.: PCT/FR2007/000171
§ 371 (c)(1),
(2), (4) Date: Jul. 29, 2008

(87) PCT Pub. No.: WO2007/088269
PCT Pub. Date: Aug. 9, 2007

(65) Prior Publication Data
US 2009/0018690 A1    Jan. 15, 2009

(30) Foreign Application Priority Data

Jan. 31, 2006 (FR) ..................... 06 00857

(51) Int. Cl.
*G05B 19/042* (2006.01)
(52) U.S. Cl.
CPC ............... *G05B 19/0426* (2013.01); *G05B 2219/23293* (2013.01)
(58) Field of Classification Search
CPC ...... G05B 19/0426; G05B 2219/23293; G05B 19/4061; G05B 2219/35316
(Continued)

(56) References Cited

U.S. PATENT DOCUMENTS 4,348,142 A * 9/1982 Figour ............................. 414/2
4,561,176 A * 12/1985 Leddet ........................ 29/709
(Continued)

FOREIGN PATENT DOCUMENTS

| EP | 0 973 078 A1 | 1/2000 |
| WO | 91/06050 A | 5/1991 |
| WO | 2004/055609 A2 | 7/2004 |

OTHER PUBLICATIONS

FANUC Series 30i/31i/32i—Model A, FANUC, Ltd., Japan, pp. 1-24, 2003.*
(Continued)

*Primary Examiner* — M. N. Von Buhr
(74) *Attorney, Agent, or Firm* — Young & Thompson

(57) ABSTRACT

The invention relates to a method of driving a workstation (1) comprising operational units (2, 3) linked to a drive automaton (7) executing a drive program, the drive program comprising for each operational unit at least one sub-part defining a plurality of strings of actions as a function of synchronization states, the drive method comprising a phase of configuration and a phase of execution of the drive program, the configuration phase comprising the steps of selecting the units to be implemented, of parametrizing the corresponding sub-parts by selecting the string of actions to be carried out and the associated synchronization states, the execution phase comprising the step of executing the drive program thus configured. The subject matter of the invention is also a workstation allowing the implementation of this method.

21 Claims, 1 Drawing Sheet

(58) Field of Classification Search
USPC ..... 700/17–20, 23, 27, 28, 83–87, 159, 160, 700/180, 245, 247–250, 257, 264; 219/136, 137 R; 713/1, 2, 100
See application file for complete search history.

(56) References Cited

U.S. PATENT DOCUMENTS

| | | | | |
|---|---|---|---|---|
| 4,578,554 | A * | 3/1986 | Coulter | 219/121.63 |
| 4,655,675 | A * | 4/1987 | Yasuoka | 414/735 |
| 5,140,237 | A * | 8/1992 | Sasaki | G05B 19/40937 318/568.11 |
| 5,340,960 | A * | 8/1994 | Takasaki | B23K 11/115 219/86.7 |
| 5,455,894 | A * | 10/1995 | Conboy et al. | 700/247 |
| 5,539,530 | A * | 7/1996 | Reifman et al. | 358/402 |
| 5,555,179 | A * | 9/1996 | Koyama et al. | 700/95 |
| 5,815,399 | A * | 9/1998 | Fujibayashi | G05B 19/4141 318/568.11 |
| 5,906,761 | A * | 5/1999 | Gilliland et al. | 219/124.34 |
| 5,928,531 | A * | 7/1999 | Sato | B23K 11/315 219/86.25 |
| 6,078,320 | A | 6/2000 | Dove et al. | |
| 6,429,404 | B1 * | 8/2002 | Suzuki | B23K 9/0216 219/124.34 |
| 6,444,942 | B1 * | 9/2002 | Kawai | B23K 11/252 219/110 |
| 6,472,634 | B1 * | 10/2002 | Houston et al. | 219/130.5 |
| 6,479,793 | B1 * | 11/2002 | Wittmann et al. | 219/130.5 |
| 6,605,800 | B1 * | 8/2003 | Schick et al. | 219/130.5 |
| 6,633,741 | B1 * | 10/2003 | Posa et al. | 434/317 |
| 6,747,247 | B2 * | 6/2004 | Holverson et al. | 219/130.5 |
| 6,815,917 | B2 * | 11/2004 | Fujinawa | B23Q 15/013 318/560 |
| 7,024,250 | B2 * | 4/2006 | Graf et al. | 700/19 |
| 7,043,332 | B1 * | 5/2006 | Fujinawa | B23B 3/168 700/159 |
| 7,049,547 | B1 * | 5/2006 | Brunner et al. | 219/132 |
| 7,076,322 | B2 * | 7/2006 | Chandhoke | 700/181 |
| 7,076,332 | B2 * | 7/2006 | Cifra et al. | 700/245 |
| 7,220,941 | B2 * | 5/2007 | Niedereder et al. | 219/132 |
| 7,291,808 | B2 * | 11/2007 | Burgstaller et al. | 219/130.01 |
| 7,515,977 | B2 * | 4/2009 | Eryurek et al. | 700/83 |
| 7,558,646 | B2 * | 7/2009 | Matsumoto et al. | 700/249 |
| 7,620,478 | B2 * | 11/2009 | Fortell | B25J 9/1682 318/568.11 |
| 7,653,977 | B2 * | 2/2010 | Wiedemann | B23K 37/047 198/575 |
| 7,680,547 | B2 * | 3/2010 | Liu et al. | 700/19 |
| 7,721,019 | B2 * | 5/2010 | Pierce et al. | 710/30 |
| 7,721,273 | B1 * | 5/2010 | Hall et al. | 717/149 |
| 8,060,834 | B2 * | 11/2011 | Lucas et al. | 715/771 |
| 2002/0156794 | A1 * | 10/2002 | Mayhew et al. | 707/102 |
| 2002/0186245 | A1 * | 12/2002 | Chandhoke et al. | 345/764 |
| 2004/0210339 | A1 * | 10/2004 | Ogino | G05B 19/406 700/177 |
| 2005/0085928 | A1 * | 4/2005 | Shani | 700/18 |
| 2005/0173390 | A1 * | 8/2005 | Lanouette et al. | 219/130.21 |
| 2006/0052900 | A1 * | 3/2006 | Kozai | G05B 19/40937 700/188 |
| 2006/0101043 | A1 | 5/2006 | Czotscher et al. | |
| 2006/0265653 | A1 * | 11/2006 | Paasonen et al. | 715/704 |
| 2008/0011728 | A1 * | 1/2008 | Peters et al. | 219/130.5 |
| 2008/0056859 | A1 * | 3/2008 | Inoue | B25J 19/0029 414/222.01 |
| 2008/0114492 | A1 * | 5/2008 | Miegel et al. | 700/248 |
| 2010/0131104 | A1 * | 5/2010 | Brown et al. | 700/275 |

OTHER PUBLICATIONS

Gertz et al., "A Human-Machine Interface for Distributed Virtual Laboratories," IEEE Robotics & Auto. Mag., vol. 1, No. 4, pp. 5-13 (Dec. 1, 1994).

* cited by examiner

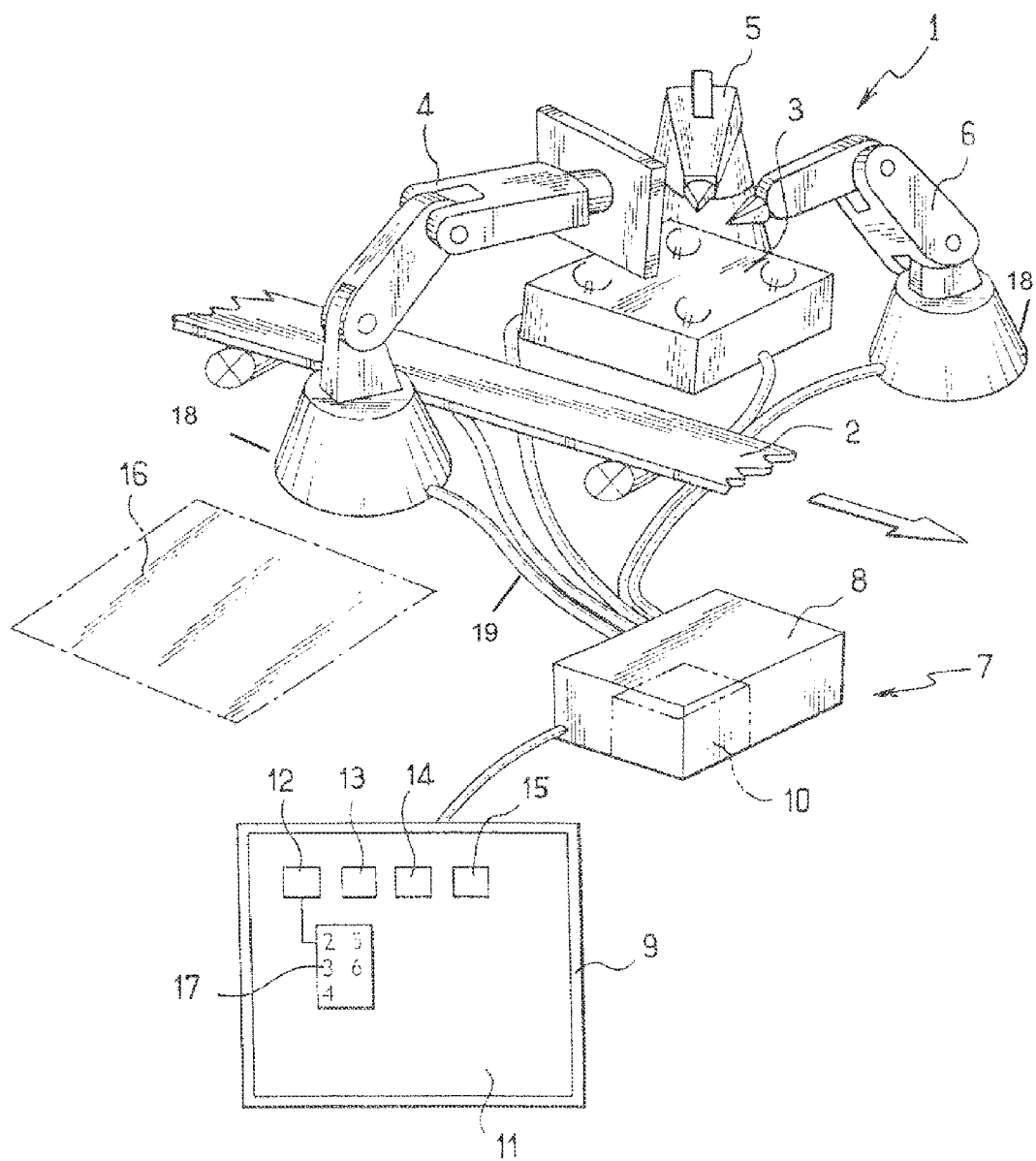

METHOD OF CONTROLLING A ROBOTIC WORK STATION, AS A FUNCTION OF SYNCHRONIZATION STATES, AND A CORRESPONDING ROBOTIC WORK STATION

The present invention relates to a method of controlling an automated work station and to a corresponding work station. The invention applies in particular to an automated assembly line for motor vehicle bodywork.

BACKGROUND OF THE INVENTION

An automated line for producing workpieces generally comprises a succession of work stations each having operational units connected to a controller. There exist very numerous types of operational unit, and for example: handling robots; welding robots; automatic machine tools; position-holding tools; conveyors; movable positioning means; and clamping members, . . . . In each work station, the operational units are arranged and controlled so as to act together on one or more workpieces by the operational units performing sequences of actions. The controller executes a control program that coordinates and synchronizes the operational units and triggers the actions to be performed by each operational unit. Actions may be performed in succession or simultaneously by a plurality of operational units, with the operational units then acting simultaneously and independently, until their respective actions have come to an end.

The control program is designed specially for each work station as a function of the requirements of the user of the work station. Program design includes a step of writing the program in a high level language or user language, and a step of compiling the program in which the high level language program is translated into machine language. Program preparation, and in particular program compilation are relatively lengthy and require significant computer resources. In this mode of operation, the program needs to be rewritten in full or in part for each new work station or for any modification to an existing work station. However, such a control program is relatively complex, particularly when the number of robots is large, so that coordinating and synchronizing movements, functions, and actions of the robots becomes difficult, such that rewriting all or part of the program requires highly skilled personnel. Taking action on the program is thus relatively lengthy and expensive, which is penalizing when it is necessary to comply with flexibility requirements.

OBJECT OF THE INVENTION

It would therefore be advantageous to have means that enable the control of an automatic work station to be simplified.

SUMMARY OF THE INVENTION

To this end, the invention provides a method of controlling at least one work station comprising operational units comprising at least one robot such as a welding robot, the operational units being connected to a controller executing a control program, the control program including, for each operational unit, at least one sub-portion that defines a plurality of sequences of actions as a function of synchronization states, the control method comprising a configuration stage and an execution stage for the control program, the configuration stage comprising the steps of selecting the units to be operated, setting parameter values in the corresponding sub-portions by selecting the sequence of actions to be performed and the associated synchronization states, with the execution stage comprising the step of executing the control program as configured in this way.

Thus, the program is compiled once only and may be common to a plurality of work stations performing different jobs. A modification to the work performed in a particular station is then easily performed by reconfiguring the control program.

The invention also provides a work station comprising operational units connected to a controller controlled by a control program, the control program including, for each operational unit, at least one sub-portion of a plurality of action sequences, and means for setting parameters values for the sub-portions.

The work station enables the method of the invention to be implemented.

Other characteristics and advantages of the invention appear on reading the following description of a particular, non-limiting element of the invention.

BRIEF DESCRIPTION OF THE DRAWING

Reference is made to the sole accompanying FIGURE that is a diagram showing a work station in accordance with the invention.

DETAILED DESCRIPTION OF THE INVENTION

With reference to the FIGURE, the work station in accordance with the invention, given overall reference 1, comprises a plurality of operational units, namely a conveyor 2, a positioning tool 3, a handling robot 4, a welding robot 5, and a welding robot 6. In known manner, the operational units incorporate actuators and sensors that are connected (e.g. via a bus) to a controller 7 comprising a computer unit 8 that is connected to an input/output (I/O) device constituted in this embodiment by a touch-sensitive display screen 9 and that is arranged to execute a control program contained in a memory 10 of the computer unit 8. The above-mentioned robots are six-axis industrial robots providing maximum capabilities in terms of intervention and flexibility. The six-axis handling robot 4 can thus present workpieces to the welding robots in optimized positions. The operational units and the controller are themselves known and are therefore not described in detail.

The operational units are arranged to perform actions in sequence.

The conveyor 2 and the handling robot 4 perform actions in three sequences A, B, and C.

In sequence A, the conveyor 2 needs to wait for the workpiece in an entry position to the work station in order to take it to an intermediate position close to the positioning tool 3. The handling robot 4 needs to take the workpiece from the conveyor in the intermediate position and place it in the positioning tool 3, and then after it has been welded by the robots 5 and 6, it needs to withdraw the workpiece from the positioning tool 3 and put it back on the conveyor 2. The conveyor 2 must wait for the workpiece in the intermediate position prior to taking it to an exit position from the work station.

In sequence B, the handling robot 4 needs to take hold of a workpiece in a zone 16 external to the work station in order to bring it to the positioning tool 3, and then after it has been welded, it needs to place the workpiece on the conveyor 2. The conveyor 2 must wait for the workpiece in the intermediate position in order it to an exit position from the work station 1.

In sequence C, the manipulating robot 4 needs to take hold of the workpiece on the conveyor 2 in order to place it on the positioning tool 3, and after it has been welded, it needs to take hold of the workpiece on the positioning tool 3 in order to place it in the zone 16 external to the work station 1.

In these sequences, the positioning tool 3 grips the workpiece when it detects it, and releases the workpiece when welding has been completed.

In each of these sequences, the welding robots 5 and 6 need to perform actions in three sequences D, E, and F, namely:

once the workpiece is in position on the positioning tool 3, the robot 5 acts first and the robot 6 acts after the robot 5 has finished (sequence D);

once the workpiece is in position on the positioning tool, the robots 5 and 6 act simultaneously (sequence E); and once the workpiece is in position on the positioning tool, the robot 6 acts first and the robot 5 acts after the robot 6 has finished (sequence F).

It should be observed that when the actions of a plurality of operational units need to be performed independently and in parallel, the sequencing with the following actions is performed once all of the preceding actions have been finished.

The action sequences of each operational unit constitute respective sub-portions of the control program. The actions are synchronized relative to one another as a function of the state that needs to be reached by at least one operational unit in order for a subsequent action of an interacting operational unit to begin (this state is referred to as a synchronization state).

To adapt the work station 1 to the work that is to be performed, the control method includes a stage of configuring the control program. Program configuration is performed after the program has been compiled such that compilation is performed once only, and the program is executed as soon as configuration has been completed, without any subsequent compilation. The configuration stage comprises selecting the operational units that are to be used, selecting the sequences of actions to be performed by each operational unit, and selecting the respective synchronization states, where necessary. The operational units, the action sequences, and the synchronization states constitute variables or parameters for the control program.

By way of example, sequence A is selected for conveyor 2 and handling robot 4, and sequence E for the welding robots 5 and 6.

The configuration stage is implemented by means of a computer routine of the control program that is arranged to enable the parameters of said program to be modified and to display an input screen page 11 on the touch-sensitive display 9 to show the values of the parameters. The input screen page 11 has fields 12, 13, 14, and 15 corresponding to the modifiable parameters for each of the respective operational units.

The term "action" is used to mean either a stage of activity for the operational unit, e.g. gripping or welding, or a stage of passivity for the operational unit, such as waiting for an event that will trigger it taking action, or indeed storing the fact that all or some of the actions that are to be performed by an operational unit have been accomplished.

In general, the event that triggers an action being performed by an operational unit is the end of an action performed by another operational unit or by the same operational unit.

When the trigger event always occurs and is mandatory, e.g. for safety reasons, the control program is predefined so that the trigger event does not need to be indicated. This applies in particular to a validation action performed by the operator in charge of workpiece loading, on each occasion that the operator has loaded a workpiece and has cleared the zone in which operational units take action.

For an action, the modifiable parameters are generally as follows:

the number of the step;

the action to be performed or the state in which the unit is to be found at the end of the action;

the identity of the operational unit that performs the action; and the place where the action is performed, e.g. presented as an identifier for an operational unit such as a tool that is used for positioning a workpiece.

For a waiting action, the modifiable parameters are as follows:

the number of the step;

identity of the operational unit that is waiting;

identity of the operational unit performing the step for which the end is being waited; and the step number of the operational unit whose end will trigger the following action in the sequence.

For a storage action, the parameters are as follows:

the number of the step; and the location of the action, e.g. in the form of an identifier for an operational unit such as a tool used for positioning a workpiece.

If there is no need to wait for a particular state before passing onto the following action of the operational unit for which the sequence of actions is being specified, then the fields designating the expected event and the operational unit that will originate the event are left blank.

Naturally, it is possible to provide other parameters that can be modified, such as timing durations for waiting stages, different types of workpiece involving different clamping operations or positioners.

When the user seeks to input a value into one of the fields 12, 13, 14, and 15 (by pressing on the zone of the touch-sensitive display 9 that corresponds to the field), the routine displays a context menu 17 giving multiple choices that present the various sequences predefined for the selected type of operational unit. Selection is performed by pressing on the zone of the touch-sensitive display 9 that corresponds to the selected option.

From the selected field values, the routine applies parameters to the control program sub-portion(s) that correspond to the operational unit that is being configured. This setting of the parameters activates the corresponding sub-portion.

This enables actions or sequences of actions by the various units to be interleaved in such a manner as to enable the units to work together.

It will be understood that the control program thus includes sub-portions relating to the operational units and that correspond to a large number of action sequences that can be performed by the operational units, and also that the configuration stage serves to select and set parameter values therefor.

The control method continues with a stage of executing the sub-portions of the configured control program that have been selected and for which parameter values have been set.

During the control stage, the control program causes the touch-sensitive display 9 to display screen pages similar to those displayed during the configuration stage (nevertheless the fields are already filled in, as configured). In order to enable proper operation of the control to be monitored at sight, the control program displays the actions it has accomplished and those that it is currently executing. When an action is finished by an operational unit, this fact is indicated, for example by a change of color on such a screen page, while actions that are currently being performed or that have not yet finished are indicated by flashing, for example.

When the execution of an action exceeds a predetermined normal execution time, a visible warning is displayed on the screen and a warning signal is sent to a supervisor station or to premises for maintenance personnel by means of an electrical connection of the Ethernet local network type or of some other type.

Furthermore, a line is displayed for showing the content of files on the screen in order to help find a possible cause for the time overrun and solve the problem that has arisen.

By way of example, the file in question is a two-dimensional (2D) or three-dimensional (3D) image of the operational unit in respect of which the system is waiting for an event or the end of an action. Advantageously, the image also has a pointer displayed thereon to designate the component from which a change of state is expected (such as the end-of-stroke sensor of an actuator, a safety device, . . . ). Said files may also contain:

an electrical schematic for the unit;
plans showing the structure of the unit; and/or
any other information useful in restarting the sequencing of actions.

Preferably, another window is displayed showing the history of error messages and the dates and times at which they were issued. Still further windows can be displayed in order to give access:

to the history of states (stopped, in normal operation, waiting for workpieces, . . . );
to curves and other statistical indicators concerning the performance of work stations and/or operational units; and/or
to error files stored in the control cabinets of the robots or other operational units (when the operational units include control cabinets 18 that are connected to a computer network 19).

Naturally, the embodiment described above is very simple in order to make the method easier to understand. In practice, the number of sequences that can be performed by a work station is much greater, particularly when the number of operational units therein is large.

It will be understood that the control program, prior to configuration, is identical for all of the work stations in a production line. This makes the line more modular and makes the stations more interchangeable.

Naturally, the invention is not restricted to the embodiment described and variants can be applied thereto without going beyond the ambit of the invention as defined by the claims.

In particular, the structure of the work station is described herein solely in order to enable the method to be understood and the method is not limited in any way thereto. The work station can thus have a structure that is different from that described and can include some other number of operational units and/or some other number of different types of operational units.

The program sub-portions mentioned in the above description of an embodiment may either be specifically portions of a single program, or they may be subprograms of a main program, or they may be slave programs controlled by a master program, . . . . The control program may have a structure that is different from that described.

The program sub-portions may correspond to an entire sequence of actions for one or more operational units, or to a portion only thereof. The robots used may for example have a number of axes other than six.

The configuration stage could be performed away from the work station.

It is possible to use an I/O device that is different from a touch-sensitive screen, and for example it is possible to use a keyboard, a mouse, and a screen, a touch-sensitive screen and a display screen, or a touch-sensitive display screen, . . . . The I/O device may be arranged to be connectable to a plurality of controllers in order to configure the control programs thereof.

The invention claimed is:

1. A method of controlling at least one work station comprising operational units arranged to act on the same workpiece, the operational units comprising at least one welding robot and one operational unit that is not a welding robot, the operational units being connected to a single controller executing a control program, the control program including, for each operational unit, at least one sub-portion that defines a plurality of different sequences of actions onto the same workpiece as a function of synchronization states, the control method comprising after the control program was compiled:
   a configuration stage and an execution stage for the control program,
   the configuration stage comprising the steps of
   i) selecting the operational units to be operated,
   ii) for each operational unit, setting parameter values in the corresponding sub-portions by selecting the sequence of actions to be performed and, when necessary, the associated synchronization states, the configuration stage enabling sequences of actions by the operational units to be interleaved in such a manner as to enable the operational units to work together on the same workpiece,
   with the execution stage comprising the step of the single controller executing the control program as configured in this way.

2. The method according to claim 1, wherein the configuration stage is implemented by a computer routine for modifying parameters of the control program, which routine is arranged to display a screen for inputting parameter values.

3. The method according to claim 2, wherein the input screen includes at least one multiple-choice context menu.

4. The method according to claim 3, wherein the input screen is displayed on a touch-sensitive display.

5. A method according to claim 2, wherein the configuration step is implemented on the controller.

6. The method according to claim 1, wherein the configuration step is implemented by loading a computer file in a memory of the controller from a computer unit external to the work station.

7. The method according to claim 1, wherein the control program is arranged, during the execution stage, displays on a screen of a touch sensitive-display at least one of the actions that have been accomplished and actions that are in a process of being accomplished.

8. A work station comprising operational units arranged to act on the same workpiece comprising at least one welding robot and one operational unit that is not a welding robot, the operational units being connected to a single controller controlled by a control program compiled, wherein the control program includes, for each operational unit, at least one sub-portion of a plurality of different sequences of actions onto the same workpiece and means for setting parameters values of the sub-portions to interleave the sequences of actions by the operational units in such a manner as to enable the operational units to work together on the same workpiece, the single controller executing the control program.

9. The work station according to claim 8, wherein the controller is associated with an I/O device arranged to enable the parameters of the control program to be modified.

10. The work station according to claim 8, wherein an I/O device comprises a screen.

11. The work station according to claim 10, wherein the screen is a touch-sensitive screen.

12. The work station according to claim 10, wherein the program enables windows to be displayed on the screen giving access to information about the operational units.

13. The work station according to claim 12, wherein the information comprises information of the operational units and an associated state thereon for which a change-of-state is expected being identified.

14. The work station according to claim 12, wherein the information comprises error messages.

15. The work station according to claim 12, wherein the information comprises operational unit states.

16. The work station according to claim 12, wherein the information relates to performance of the work station.

17. The work station according to claim 8, wherein the operational units incorporate control cabinets connected to a computer network.

18. A work station according to claim 17, wherein the program is arranged to provide access to information stored in the control cabinets.

19. The work station according to claim 9, wherein the I/O device is removable.

20. The work station according to claim 8, wherein the operational units comprise a welding robot, and a workpiece handling robot.

21. A computer readable memory with a control program stored thereon, the control program executed by a computer unit of a single controller of a robotic work station to perform the method of:
   defining a plurality of different sequences of actions onto a same workpiece as a function of synchronization states for each of a plurality of operational units of the robotic work station that include at least one welding robot and one operational unit that is not a welding robot;
   selecting each of the plurality of operational units of the robotic work station to be operated;
   setting parameters values for each of the plurality of operational units of the robotic work station for each action to perform the sequence actions and synchronization states, wherein the control program includes, for each operational unit, at least one sub-portion of a plurality of different sequences of actions onto the same workpiece, and the setting parameters values of the sub-portions enabling sequences of actions by the operational units to be interleaved in such a manner as to enable the operational units to work together on the same workpiece; and
   driving each of the plurality of operational units of the robotic work station in correspondence to the parameter values.

* * * * *